(12) United States Patent
Sigoure et al.

(10) Patent No.: US 10,917,284 B2
(45) Date of Patent: Feb. 9, 2021

(54) METHOD AND SYSTEM FOR USING AN OPENCONFIG ARCHITECTURE ON NETWORK ELEMENTS

(71) Applicant: Arista Networks, Inc., Santa Clara, CA (US)

(72) Inventors: Benoit Sigoure, San Francisco, CA (US); Andrew Fort, San Francisco, CA (US)

(73) Assignee: Arista Networks, Inc., Santa Clara, CA (US)

( * ) Notice: Subject to any disclaimer, the term of this patent is extended or adjusted under 35 U.S.C. 154(b) by 496 days.

(21) Appl. No.: 15/162,244

(22) Filed: May 23, 2016

(65) Prior Publication Data

US 2017/0339002 A1 Nov. 23, 2017

(51) Int. Cl.
*H04L 29/08* (2006.01)
*H04L 12/24* (2006.01)

(52) U.S. Cl.
CPC .......... *H04L 41/0226* (2013.01); *H04L 41/08* (2013.01); *H04L 67/2823* (2013.01); *H04L 41/0853* (2013.01)

(58) Field of Classification Search
CPC . H04L 67/2823; H04L 41/0226; H04L 41/08; H04L 41/0853
See application file for complete search history.

(56) References Cited

U.S. PATENT DOCUMENTS

| | | | |
|---|---|---|---|
| 7,299,237 B1 * | 11/2007 | Clark .................... | G06F 16/214 |
| 7,774,440 B1 | 8/2010 | Bagrodia et al. | |
| 8,291,468 B1 * | 10/2012 | Chickering ......... | H04L 63/0884 726/1 |
| 8,667,394 B1 | 3/2014 | Spencer | |
| 8,874,719 B1 | 10/2014 | Burnett et al. | |
| 9,003,292 B2 | 4/2015 | Smith et al. | |
| 9,235,802 B1 | 1/2016 | Chamness | |
| 9,461,877 B1 | 10/2016 | Nadeau et al. | |
| 9,697,172 B1 | 7/2017 | Somohano et al. | |
| 10,003,629 B2 * | 6/2018 | Pech ................... | G06F 9/45529 |
| 10,187,286 B2 | 1/2019 | Sigoure | |
| 2004/0015609 A1 * | 1/2004 | Brown ................ | H04L 43/0817 709/246 |
| 2004/0255028 A1 | 12/2004 | Chu et al. | |
| 2004/0267916 A1 | 12/2004 | Chambliss et al. | |
| 2005/0204028 A1 | 9/2005 | Bahl et al. | |
| 2006/0036527 A1 | 2/2006 | Tinnirello et al. | |

(Continued)

FOREIGN PATENT DOCUMENTS

| | | |
|---|---|---|
| CN | 1490979 A | 4/2004 |
| CN | 101553797 A | 10/2009 |

*Primary Examiner* — Jeong S Park
(74) *Attorney, Agent, or Firm* — Chamberlain, Hrdlicka, White, Williams & Aughtry

(57) ABSTRACT

In general, embodiments of the invention relate to a method for managing network element state information (NESI). The method includes receiving, from a target entity, a state information request, storing a preferred transport protocol (PTP), obtaining a preferred serialization encoding (PSE), determining, in response to the state information request, that a program specific representation (PSR) on a network element is populated with the NESI, serializing the PSR using the PSE, and transmitting a serialized PSR, to the target entity, using the stored PTP.

19 Claims, 9 Drawing Sheets

(56) References Cited

U.S. PATENT DOCUMENTS

| | | |
|---|---|---|
| 2006/0041494 A1 | 2/2006 | Tinnirello et al. |
| 2006/0041660 A1 | 2/2006 | Bishop et al. |
| 2006/0085507 A1 | 4/2006 | Zhao et al. |
| 2007/0226630 A1 | 9/2007 | Farid et al. |
| 2009/0172148 A1 | 7/2009 | Underwood |
| 2009/0228586 A1 | 9/2009 | Claise et al. |
| 2013/0235870 A1 | 9/2013 | Tripathi et al. |
| 2014/0075327 A1 | 3/2014 | Noel et al. |
| 2014/0269319 A1 | 9/2014 | DeCusatis et al. |
| 2014/0337467 A1* | 11/2014 | Pech ............. H04L 67/02 709/217 |
| 2015/0074260 A1 | 3/2015 | Anand et al. |
| 2015/0092561 A1 | 4/2015 | Sigoure |
| 2015/0100675 A1 | 4/2015 | Davie et al. |
| 2015/0277953 A1 | 10/2015 | Xu |
| 2015/0358200 A1 | 12/2015 | Mahajan et al. |
| 2015/0358209 A1 | 12/2015 | Zhang et al. |
| 2016/0057052 A1 | 2/2016 | Zhang et al. |
| 2016/0154907 A1 | 6/2016 | Halabe et al. |
| 2016/0277272 A1 | 9/2016 | Peach et al. |
| 2017/0004221 A1* | 1/2017 | Olsen ............. G06F 16/986 |
| 2017/0145061 A1 | 5/2017 | Lu et al. |
| 2017/0250951 A1 | 8/2017 | Wang et al. |

* cited by examiner

METHOD AND SYSTEM FOR USING AN OPENCONFIG ARCHITECTURE ON NETWORK ELEMENTS

BACKGROUND

Network administrators continue to face challenges incurring in the management of large-scale networks. Often these large-scale networks include numerous network elements from multiple vendors, each with their own proprietary mechanism for configuration and management. This results in network administrator increased costs and greater implementation complexity network administrator

SUMMARY

In general, in one aspect, embodiments of the invention relate to a method for managing network element state information (NESI). The method includes receiving, from a target entity, a state information request, storing a preferred transport protocol (PTP), obtaining a preferred serialization encoding (PSE), determining, in response to the state information request, that a program specific representation (PSR) on a network element is populated with the NESI, serializing the PSR using the PSE, and transmitting a serialized PSR, to the target entity, using the stored PTP.

In general, in one aspect, the invention relates to a method for managing network element state information (NESI). The method includes receiving, from a target entity, a state information request, storing a preferred transport protocol (PTP), obtaining a preferred serialization encoding (PSE), determining that a program specific representation (PSR) is not populated with the NESI, based on the determination, populating the PSR with the NESI obtained from an internal data model to obtain a populated PSR, serializing the populated PSR using the stored PSE, and transmitting a serialized PSR, to the target entity, using the stored PTP.

In general, in one aspect, the invention relates to a network element. The network elements includes a data plane comprising a plurality of ports, a control plane comprising an OpenConfig agent configured to: receive, from a target entity, a state information request, store a preferred transport protocol (PTP), obtaining a preferred serialization encoding (PSE), determine that a program specific representation (PSR) is not populated with network element state information (NESI), based on the determination, populating the PSR with the NESI obtained from an internal data model to obtain a populated PSR, serialize the populated PSR using the stored PSE, and transmit a serialized PSR, to the target entity, using the stored PTP.

In general, in one aspect, the invention relates to a non-transitory computer readable medium comprising computer readable program code, which when executed by a processor enables the processor to receive, from a target entity, a state information request, store a preferred transport protocol (PTP), obtaining a preferred serialization encoding (PSE), determine that a program specific representation (PSR) is not populated with network element state information (NESI), based on the determination, populating the PSR with the NESI obtained from an internal data model to obtain a populated PSR, serialize the populated PSR using the stored PSE, and transmit a serialized PSR, to the target entity, using the stored PTP.

Other aspects of the invention will be apparent from the following description and the appended claims.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1A-5, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention provide a method and a system for enabling the sharing of network element state information (NESI) between vendor-neutral configuration data models, standardized and published by operators of $3^{rd}$ party devices, and internal, vendor-proprietary data models associated with the network element. More specifically, embodiments of the invention provide a flexible framework that enables network elements to share NESI with $3^{rd}$ party devices.

Figure 1A:
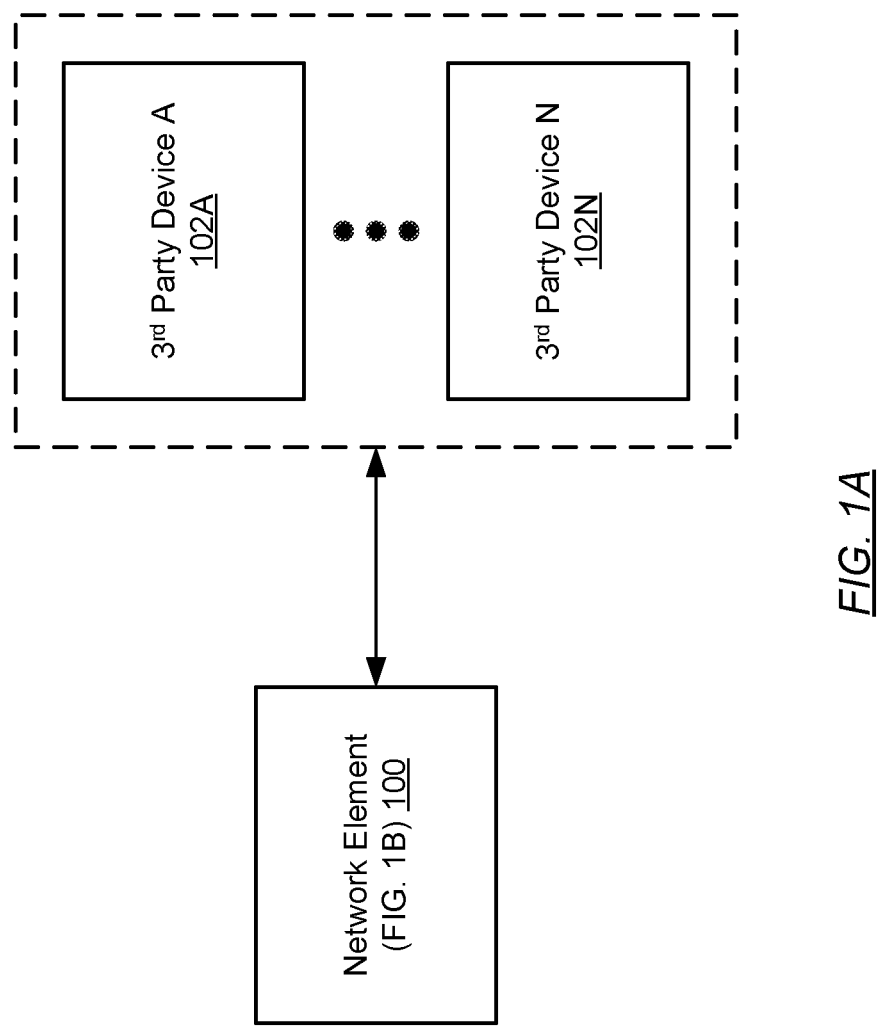
FIG. 1A shows a system in accordance with one or more embodiments of the invention.

FIG. 1A shows a system in accordance with one or more embodiments of the invention. The system includes a network element (100) and one or more $3^{rd}$ party devices (102A, 102N). The aforementioned components may be directly or indirectly connected to each other using any combination of wired or wireless connections. In embodiments in which the aforementioned components are indirectly connected to one another, there may be other network elements (or systems) (not shown) that facilitate communication between the aforementioned components. The aforementioned components may communicate with each other using any combination of wired and/or wireless communication protocols. Each of these components is described below.

In one embodiment of the invention, a network element (100) is a physical device that includes persistent storage, memory (e.g., Random Access Memory), one or more processors (including a switch chip), and two or more physical ports. In one or more embodiments of the invention, the switch chip is hardware that determines which egress port on a switch to forward media access (MAC) frames. The switch chip may include egress and ingress ports that may connect to ports on the switch. Each port may or may not be connected to another device on a network (e.g., a server, a switch, a router, etc.). The network element may be configured to receive packets via the ports and determine whether to (i) drop the packet, (ii) process the packet in accordance with one or more embodiments of the invention, and/or (iii) send the packet, based on the processing, out another port of the network element.

How the network element makes the determination of whether to drop the packet, and/or send the packet to another device on the network depends, in part, on whether the network element is a layer-2 (L2) switch or a layer-3 (L3) switch (also referred to as a multi-layer switch), which may perform at least some functions of a router. If the network element is operating as a L2 switch, the network element uses the destination MAC address along with a forwarding table to determine out of which port to send the packet. If the network element is operating as a L3 switch, the network element uses the destination IP address along with a routing table to determine out of which port to send the packet, and includes the ability to write the MAC address of the next device to receive the packet in place of its own MAC address (which the last device to send the packet wrote) in the L2 information encapsulating the packet. If the network element is a multi-layer switch, the multi-layer switch includes functionality to process packets using both MAC addresses and IP addresses.

In one embodiment of the invention, the persistent storage in the network element may include any type of non-transitory computer readable medium that includes instructions, which, when executed by one or more processors in the network element, enable the network to perform the functions described in accordance with one or more embodiments of the invention (see e.g., FIGS. 1B, 1C, 1D, 2A, 2B, 3, and 4). Additional details about the network element are described below.

In one embodiment of the invention, a $3^{rd}$ party device (102A, 102N) corresponds to any type of computing system (see e.g., FIG. 5) that is configured to interact with the network element (100). For example, the $3^{rd}$ party device may be a desktop computer operated by a network administrator. In this example, the network administrator may have configured the network element to receive state information requests, as well as transmit network element state information (NESI) through responses and updates (described below). Subsequently, the network administrator may review and issue changes to the NESI for the network element to implement. Additional detail about the $3^{rd}$ party devices is described below with respect to FIGS. 2A-3.

Figure 1B:
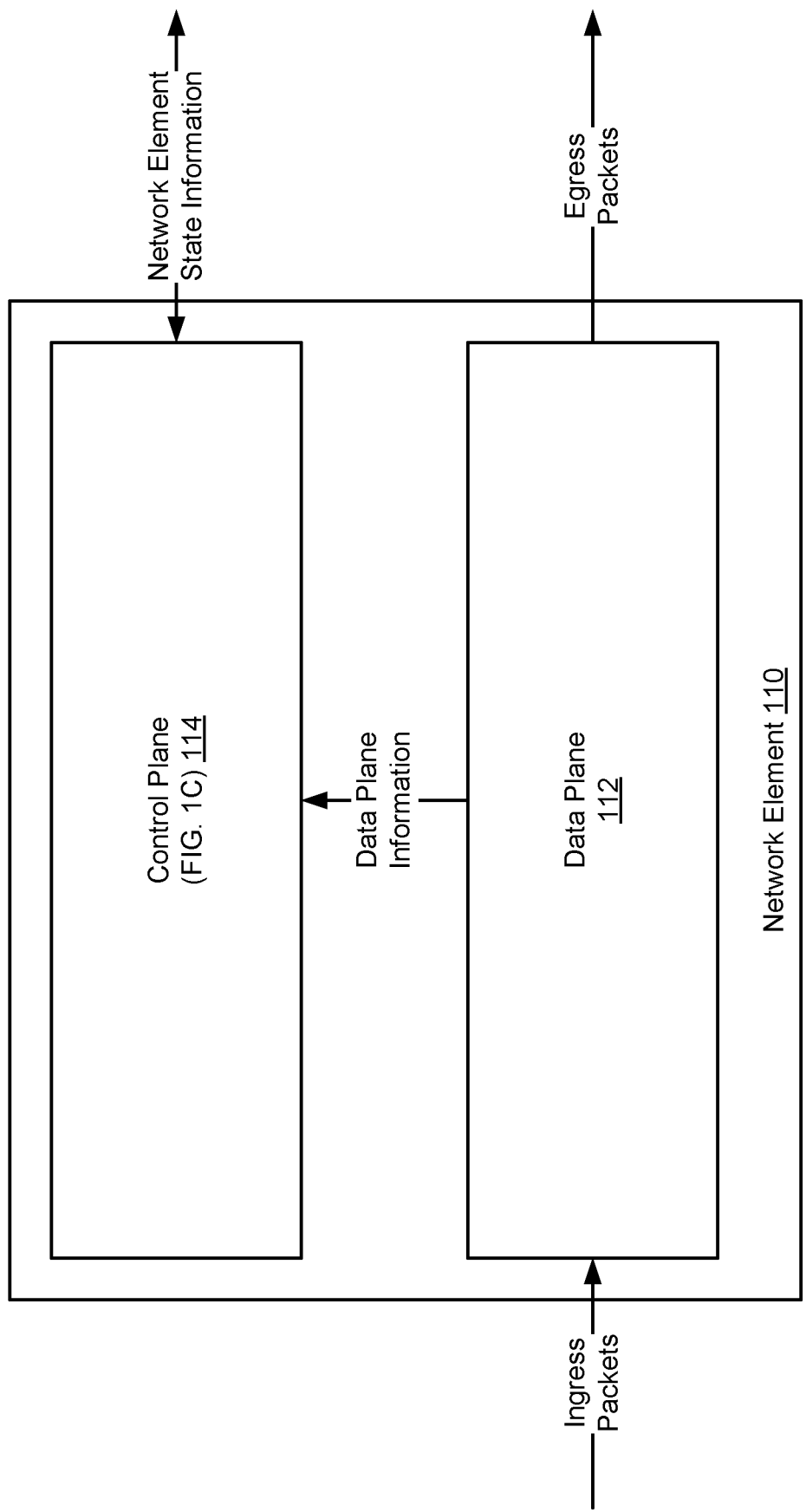
FIG. 1B shows a network element in accordance with one or more embodiments of the invention.

FIG. 1B shows a network element in accordance with one or more embodiments of the invention. The network element (110) includes a data plane (112) and a control plane (114). The data plane includes functionality to receive packets (denoted as ingress packets) via ports (not shown), process the packets (as described above) and, as appropriate, transmit packets (denoted as egress packets) via the ports towards a destination. The data plane (112) also includes functionality to gather data plane information and to provide this data plane information to the control plane (114). In one or more embodiments of the invention, data plane information includes, but is not limited to, network usage data, flow information based on the sampling of packets received by the data plane, information related to queue depths on ingress and egress buffers (not shown) in the data plane, and other data traffic statistics. Additional and/or alternative data plane information may be provided and/or exist without departing from the scope of the invention.

In one embodiment of the invention, the control plane (114) includes functionality to manage the overall operation of the network element. More specifically, the control plane includes functionality to manage the operation of the data plane (including programming of the forwarding table). The control plane may also include functionality to receive and respond to state information requests pertaining to the network element (110) where the control plane is residing. In addition, the control plane may also include functionality to push or receive changes to network element state information (NESI) to and from one or more target entities (e.g., $3^{rd}$ party devices, virtual machines executing on $3^{rd}$ party devices, etc.). Additional details about the control plane are described in FIG. 1C.

Figure 1C:
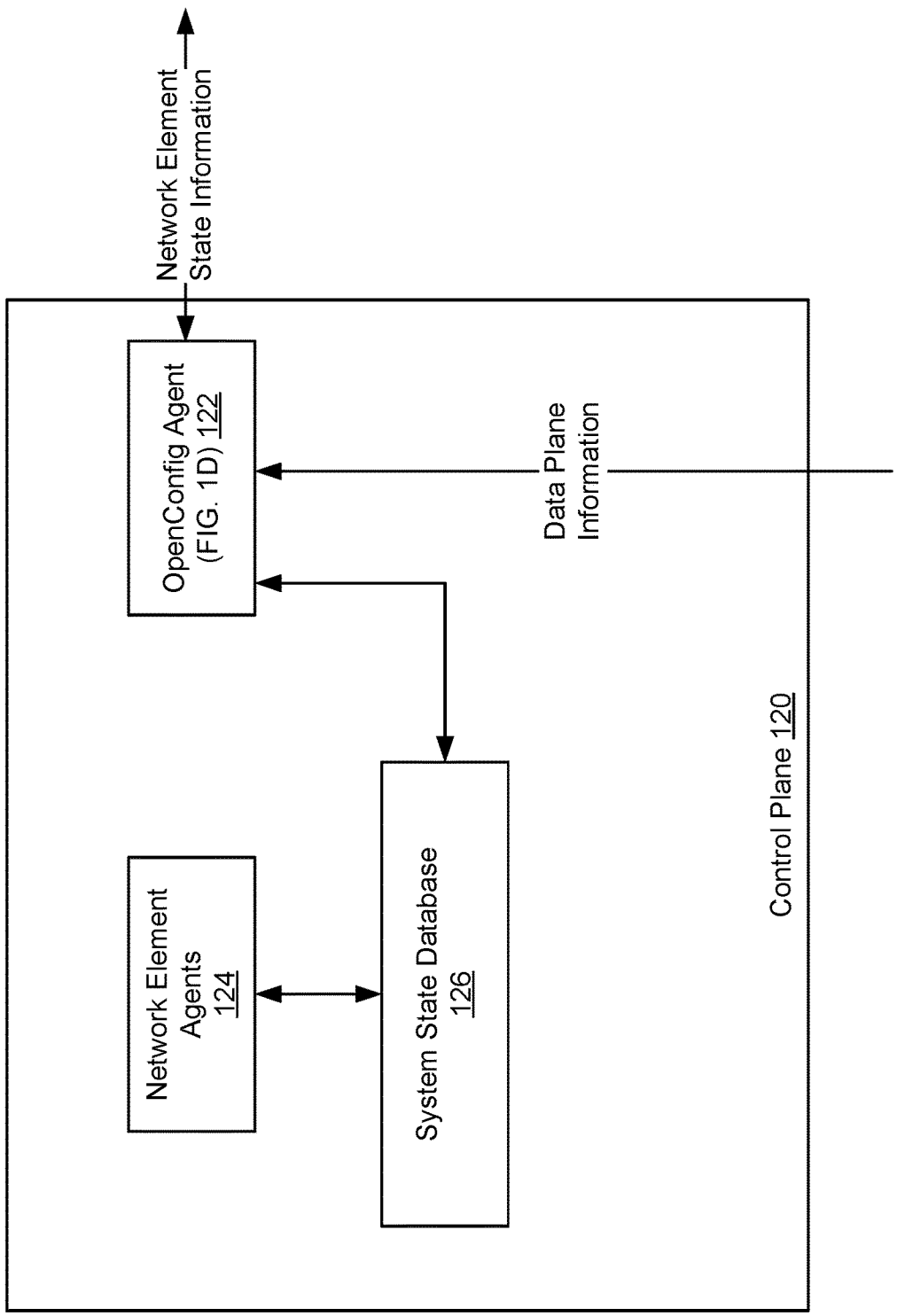
FIG. 1C shows a control plane of a network element in accordance with one or more embodiments of the invention.

FIG. 1C shows a control plane of a network element in accordance with one or more embodiments of the invention. The control plane (120) may include an OpenConfig agent (122), one or more network element agents (124), and a system state database (SSD) (126). Each of these components is described below.

In one embodiment of the invention, each of the network element agents (124) implements one or more protocols, processes, and/or services of the network element. Examples of network element agents include, but are not limited to, a command line interface agent, a routing information base agent, a forwarding information base agent, a simple network management protocol (SNMP) agent, etc.

The system state database (SSD) (126) (which may be implemented using any combination of shared and non-shared memory) that includes the current state of the network element (e.g., all values in all data structures used by any of the network element agents, which may be stored in the SSD). For example, the SSD may include the current routing table entries as determined by the routing information base agent. The SSD may include the values of all variables and/or parameters that are currently specified in the network element. In one embodiment of the invention, the SSD stores the aforementioned information in records within the SSD. The specific content of the records in the SSD may vary based on the implementation of the invention. Accordingly, a record within the SSD may include all, some or none of the following the name of the variable (or name of the parameter), the current value of the variable (or parameter), and a timestamp indicating when the record was created (or last modified). Further, a SSD may store other and/or different information about the current state of the network element without departing from the invention. While the SSD shown in FIG. 1C is shown as a single entity, in other embodiments of the invention, various portions of the SSD may be stored in different locations within the network element.

In one embodiment of the invention, each of the network element agents (124) includes functionality to access various portions of the SSD (126) in order to obtain the relevant portions of the state of the network element in order to perform various functions. In addition, the network element agents include functionality to update the state of the network element by writing new and/or updated values in the SSD.

In one embodiment of the invention, the OpenConfig agent (122) includes functionality to: (i) obtain the state of the network element and any updates to the state of the network element, (ii) obtain traffic statistics and/or other information, without departing from the scope of the invention, from the data plane, and then (iii) provide the information obtained in (i) and (ii) to one or more target entities (e.g., $3^{rd}$ party devices, virtual machines executing on $3^{rd}$ party devices, etc.). The information collected in (i) and (ii) may be collectively referred to as network element state information (NESI). The OpenConfig agent may include functionality to send NESI to one or more target entities anytime there is a change in the state of the network element (e.g., anytime there is a change of any value in any portion of the SSD (126)). The OpenConfig agent may also include functionality to receive NESI back from, which had been altered by, target entities, and to write state into and/or provide change notifications to the system state database (SSD) (126). Further, in one embodiment of the invention, the OpenConfig agent also includes functionality to generate program specific representations (PSRs), which may be configuration data models based on vendor-neutral configuration data models (i.e., OpenConfig data models) provided by a network administrator when requesting NESI. Additional detail about the OpenConfig agent is described in FIG. 1D.

Figure 1D:
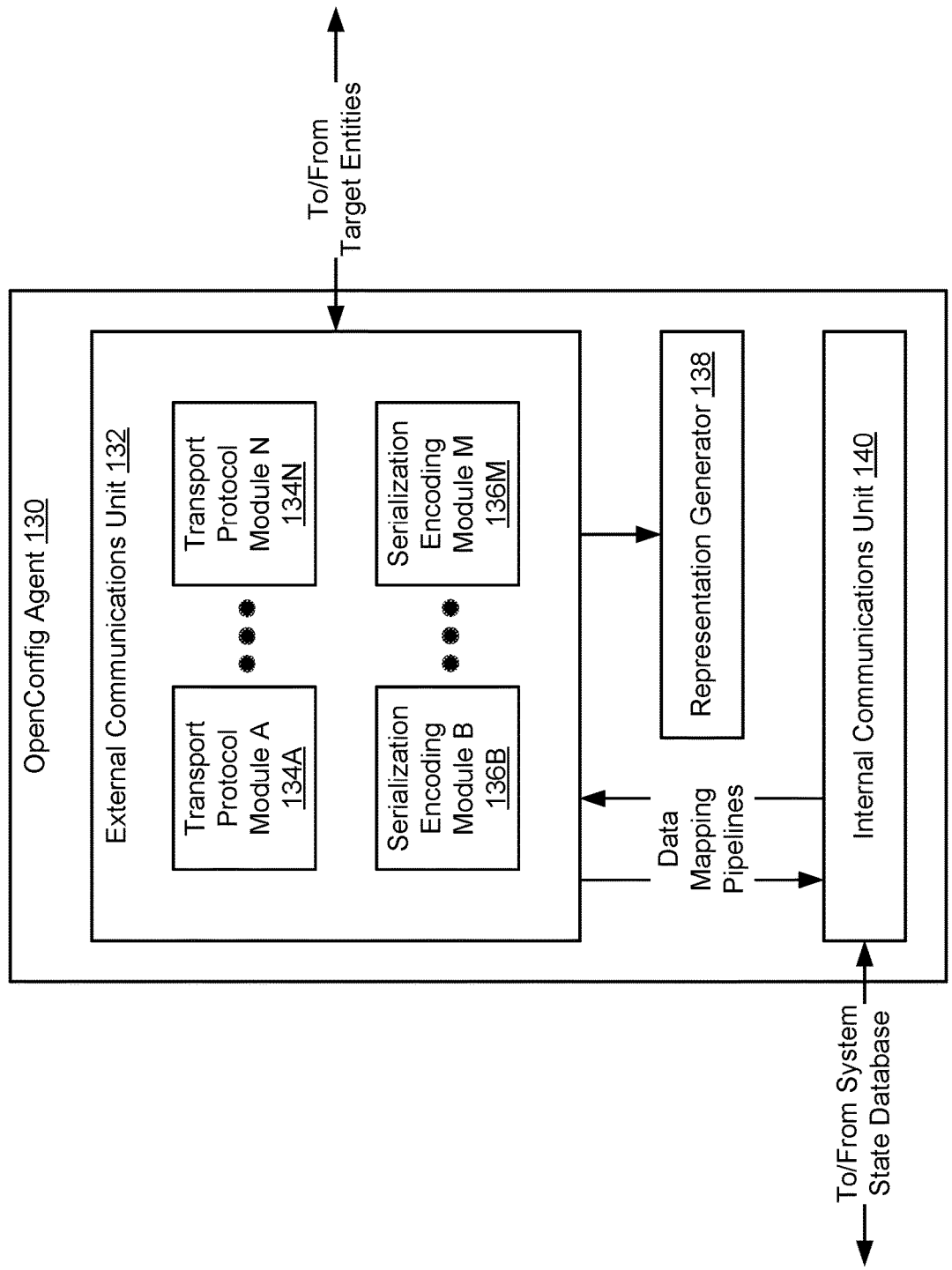
FIG. 1D shows an OpenConfig agent of a control plane of a network element in accordance with one or more embodiments of the invention.

FIG. 1D shows an OpenConfig agent of a control plane of a network element in accordance with one or more embodiments of the invention. The OpenConfig agent (130) may include an external communications unit (ECU) (132), a representation generator (138), and an internal communications unit (ICU) (140). Each of these components is described below.

In one embodiment of the invention, the external communications unit (ECU) (132) manages NESI transfer between the OpenConfig agent (130) and one or more target entities (e.g., $3^{rd}$ party devices, virtual machines executing on $3^{rd}$ party devices, etc.). The ECU may include the functionality to transmit and receive NESI through a number of supported transport protocols using one or more transport protocol modules (134A, 134N). Each transport protocol module (134A, 134N) serves to provide a mechanism that facilitates the transfer of data across a network. Examples of transport protocols, that which the OpenConfig agent (130) may use to communicate with target entities, include but are not limited to: HTTP, HTTPS, HTTP2, SPDY, QUIC, gRPC, Thrift Mux, RESTCONF, NETCONF, SOAP, and XMPP. Additionally, the ECU may include functionality to serialize (e.g., translate data structures or objects into a stream of bytes) and deserialize (e.g., extract data structures or objects from a stream of bytes) NESI that is to be transmitted or has been received, respectively. Accordingly, the ECU may also include one or more serialization encoding modules (136B, 136M). Each serialization encoding module (136B, 136M) serves to provide a mechanism that converts NESI to and from a supported serialization format. Examples of serialization formats, that which may be supported by the OpenConfig agent (130), include but are not limited to: JSON, XML, ASN.1, Protocol Buffer, Thrift, BSON, BDSN, YAML, "gob" (based on the Go programming language), and Cap'n Proto.

In one embodiment of the invention, the representation generator (138) may include the functionality to generate program specific representations (PSRs). In one embodiment of the invention, PSRs, in this application, are expressions of the vendor-neutral configuration data models (e.g., OpenConfig data models) provided by network administrators through NESI requests. PSRs may be provided by (or obtained from) other sources without departing from the invention. These aforementioned vendor-neutral configuration data models may also serve as blueprints for how NESI is to be structured and/or presented to the requesting network administrator (e.g., $3^{rd}$ party device). In view of this, PSRs may be generated, for example, through the compiling of these blueprints (e.g., OpenConfig data models) to produce data structures in any schema supported by the network element.

In one embodiment of the invention, the internal communications unit (ICU) (140) manages data (e.g., state information, notifications, etc.) transfer between the system state database (SSD) and the OpenConfig agent (130). Subsequently, the ICU includes functionality to update the state of the network element by writing new and/or updated values into the SSD. In addition, the ICU includes functionality to obtain network element state information (NESI) by reading the current values associated with variables (or parameters) within the SSD.

In one embodiment of the invention, the external communications unit (ECU) (132) and internal communications unit (ICU) (140) may exchange network element state information (NESI), through a generated program specific representation (PSR), utilizing a pair of data mapping pipelines. Each data mapping pipeline refers to a unidirectional conveyance of data (e.g., NESI) between the ECU and the ICU; and more specifically, a conveyance of data between the PSR and an internal data model that organizes and stores NESI at the SSD, respectively. More specifically, in one embodiment of the invention, each pipeline includes functionality to, for example, convert an address and a value in one model system to one or more addresses and values in another model system. Further, each data mapping pipeline may include a generator, one or more pipe functions, and a sink. In one embodiment of the invention, the generator is a segment of the pipeline anchored at a source of NESI (e.g., PSR or the internal data model depending on the direction of NESI transfer) and that provides NESI to the pipeline. The sink refers to a segment of the pipeline that anchors to a destination of NESI (e.g., internal data model or PSR depending on the direction of NESI transfer) and that receives NESI from the pipeline and subsequently stores the NESI into the destination model. Moreover, in one embodiment of the invention, each of the one or more pipe functions serves to transform the emitted NESI, from the data structure of a source data model, into a form compatible with the data structure of the destination data model. Examples of operations that each pipe function may perform include, but are not limited to, data type conversion and data address translation.

The invention is not limited to the system architecture shown in FIGS. 1A-1D.

While the various steps in this flowchart are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention.

Figure 2A:
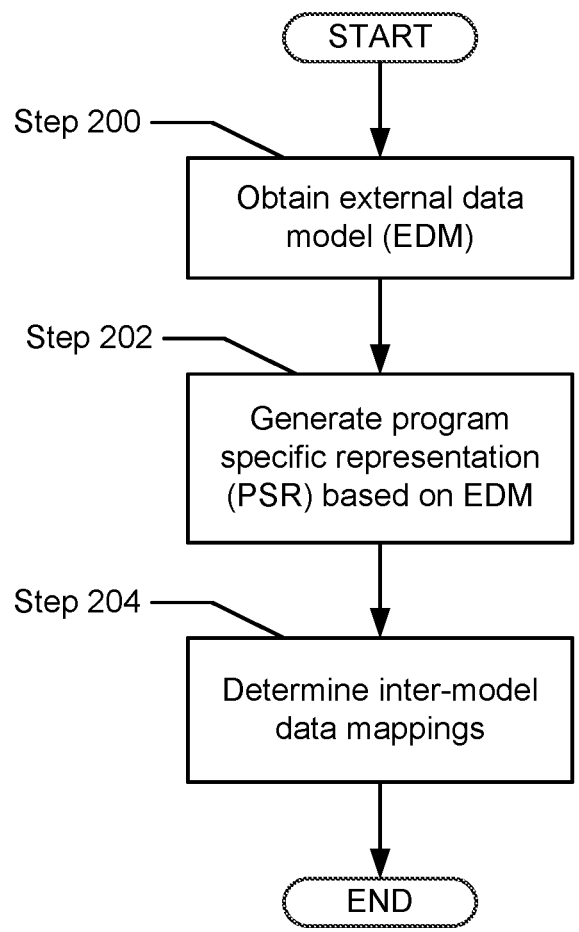
FIG. 2A shows a method for loading a program specific representation (PSR) in accordance with one or more embodiments of the invention.

FIG. 2A shows a method for loading a program specific representation (PSR) in accordance with one or more embodiments of the invention. In one embodiment of the invention, the loading process described hereafter occurs during the manufacturing of the network element, hence prior to the operational use of the network element. Amongst the various software and firmware components installed on the network element during finalization of the product, PSRs, which correspond to the various predetermined data models a $3^{rd}$-party entity (e.g., customer) may utilize to structure NESI, are loaded before delivery of the network element to the customer. In another embodiment of the invention, the loading process described hereafter may occur on occasion during the operational use of the network element. A scenario where such an embodiment may incur, for example, may be when the network element receives a new or updated data model, from a target entity, along with or before a state information request (see e.g., FIG. 2B). In such cases, upon recognizing that none of the pre-loaded PSRs are associated with a new or updated data model, the OpenConfig agent may generate and store a PSR (or update the existing PSR) for the received data model.

Proceeding along with the discussion of FIG. 2A, in Step 200, an external data model (EDM) is obtained. In one embodiment of the invention, the external data model refers to the vendor-neutral configuration data model (e.g., OpenConfig YANG model) published and sent by a network administrator associated with the target entity. The EDM may be used to model all or portion of the operation of a network element. For example, the EDM may include all configuration (e.g., values that are set by a network administrator) for a given network protocol (e.g., BGP) Further, the EDM may include operational data associated with the network element (i.e., data that results from the operation of one or more network protocols). As mentioned above, in one embodiment of the invention, the EDM is furnished prior to the operational use of the network element (e.g., the EDM is provided by (or otherwise obtained from) an administrator). In another embodiment of the invention, the EDM may be provided with a state information request initiated by a target entity (e.g., $3^{rd}$-party device, virtual machine executing on $3^{rd}$-party device, etc.). One non-limiting example of an EDM is "BGP Model for Service Provider Networks" (updated Aug. 8, 2015).

In Step 202, a program specific representation (PSR) is generated based on the obtained EDM. In one embodiment of the invention, a PSR may be a complete, compiled expression of the EDM, where the EDM may be considered the blueprint from which the data structure(s) that is the PSR is to be extrapolated. Further, in one embodiment of the invention, the PSR is produced in any programming language supported by the network element. In another embodiment of the invention, the PSR is a data structure generated in memory when the EDM is loaded by the OpenConfig agent.

In Step 204, data mappings between the proprietary, internal data model and the PSR are determined. In one embodiment of the invention, the internal data model is a vendor specific data model that is implemented by the vendor on the network element. The data mappings serve to translate state information (or NESI), presented in the former model system form, to that of the latter model system form. More specifically, in one embodiment of the invention, for every variable (or parameter) within a request-relevant subset of all data structures used by any of the network element agents, the address and value of a variable (or parameter) in the internal data model is mapped into one or more addresses and values, representing that variable (or parameter), in the PSR. Moreover, the translation of the value component may entail data type conversion as appropriate. For example, in the case of the autonomous system number (ASN) with regards to the border gateway protocol (BGP), the ASN in a PSR may be of integer type, whereas the ASN in the internal data model may be of string type, hence, the data mapping for the ASN variable (or parameter) warrants string to integer conversion in addition to path reassignment between models. In another embodiment of the invention, rather than being determined by vendor-generated code for a particular network element, data mappings may be determined based on real-time input and/or involvement from a network administrator (or customer) as the translations are taking place.

In another embodiment of the invention, a configuration file may be obtained that includes the mappings between the PSR and the internal data model of the network element. The configuration file may be generated by an administrator, by the network element vendor, and/or by a third party. The configuration file may include mappings between the data structures (or portions thereof) in the PSR and the internal data model of the network element.

Figure 2B:
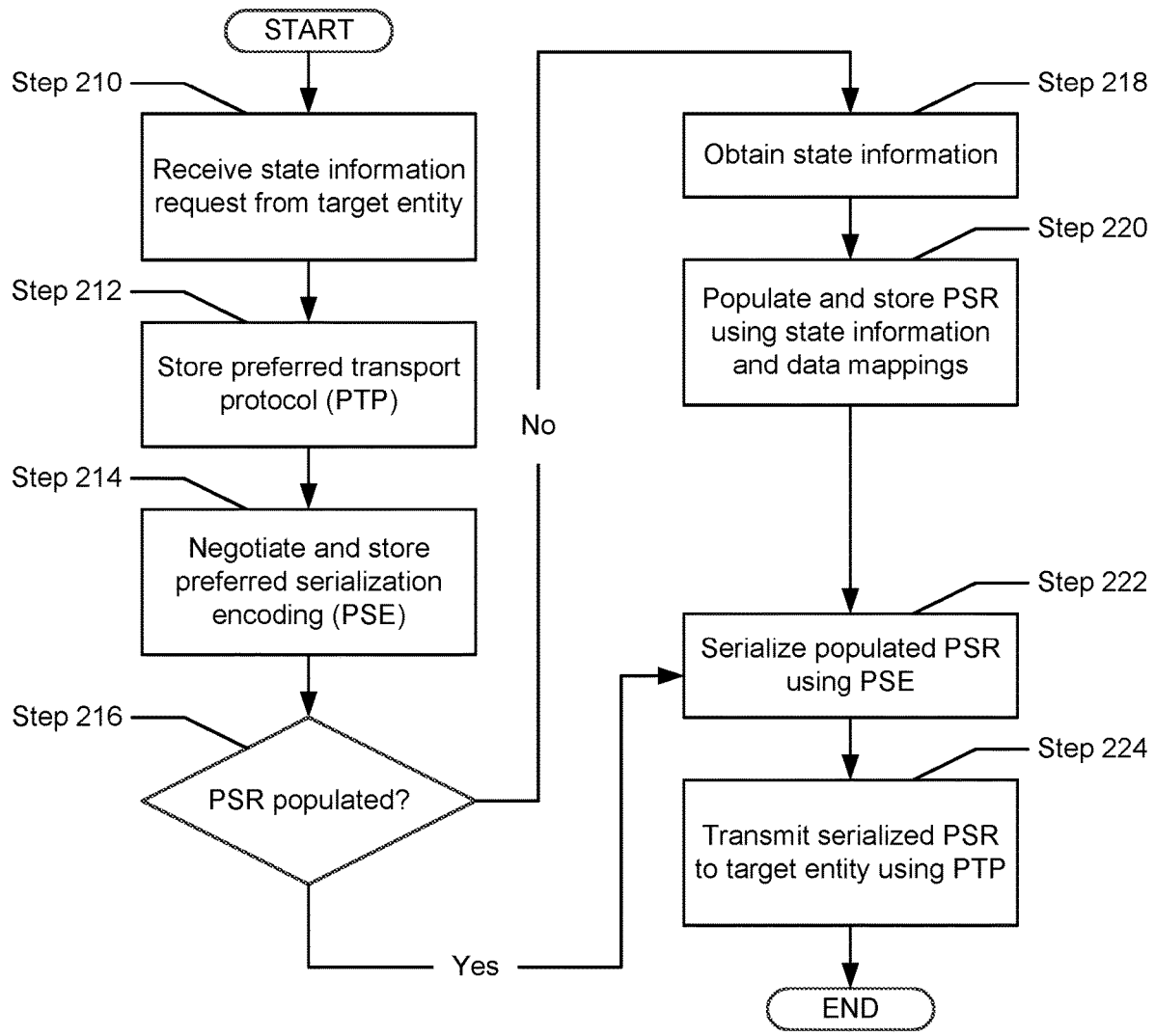
FIG. 2B shows a method for managing network element state information (NESI) in accordance with one or more embodiments of the invention.

FIGS. 2B-4 show methods for sharing network element state information (NESI) in accordance with one or more embodiments of the invention. More specifically, FIG. 2B shows a method for sending NESI, in the form of a program specific representation (PSR), in response to a state information request by a target entity (e.g., $3^{rd}$ party device, virtual machine executing on $3^{rd}$ party device, etc.) in accordance with one or more embodiments of the invention.

In Step 210, a state information request is received from a target entity. More specifically, the target entity may periodically poll the OpenConfig agent to obtain NESI. In one embodiment of the invention, the state information request is received via a connection using a transport protocol supported by the network element and preferred by the target entity as an acceptable medium to transfer the requested NESI. In one embodiment of the invention, the target entity is any 3rd party device (see e.g. FIG. 1A). The state information request may specify the PSE (see e.g., step 214). In one embodiment of the invention, the state information request specifies the NESI to be obtained from the network element. The NESI to be obtained may be specified in an NESI specification, where the NESI specification indicates (at any level of granularity) the NESI to obtain from the network element.

In Step 212, the aforementioned preferred transport protocol (PTP) is stored. In one embodiment of the invention, storage of the PTP may serve to record the association between the transport protocol to be used when the network element is communicating with the target entity.

In Step 214, a negotiation involving the requesting target entity takes place in order to concur upon a serialization encoding supported by the network element as well as preferred by the target entity as an acceptable format for transferring the requested NESI. In one embodiment of the invention, a serialization encoding deemed acceptable to the target entity is enclosed along with the state information request. For example, the preferred serialization encoding (PSE) may be embedded within a HTTP-Accept header encapsulating the sent request, which when decapsulated, specifies how the target entity prefers the NESI to be delivered. Further, in another embodiment of the invention, a list of acceptable serialization encodings is sent along with the request, which may be extracted and then compared against available serialization formats supported by the network element. A common serialization encoding found both on the list of acceptable serialization encodings and the list of supported serialization formats may then be considered the PSE. Additionally, in another embodiment of the invention, it may be the case that two or more common serialization encodings result from comparing the acceptable encodings with the supported formats. In such an embodiment, the resulting serialization encodings may be filtered down to a defining PSE by assessing which acceptable serialization encoding is most compatible with the preferred transport protocol (PTP) with regards to, for example, optimal data quality or degree of cohesion amongst the serialization and transport mechanisms. Also in Step 214, for similar reasons as described in Step 212, the PSE is also stored. In one embodiment of the invention, no negotiation takes place; rather, a default PSE that is appropriate for the PTP is automatically selected.

In Step 216, a determination is made with regards to whether a loaded and instantiated program specific representation (PSR) is already populated with relevant NESI or not. In one embodiment of the invention, upon activation, the OpenConfig agent instantiates the loading of the PSR. After instantiating a PSR, in one embodiment of the invention, the OpenConfig agent may continually populate and/or update the PSR with state information obtained from the system state database (SSD), where the PSR may be populated synchronously and/or asynchronously. In such an embodiment, upon receiving a state information request, the requested NESI may immediately be serialized and transmitted to the requesting target entity. In another embodiment, after instantiating a PSR, the OpenConfig agent may remain idle until a request is received. In such an embodiment, the state information request triggers obtaining of the NESI, by the OpenConfig agent, from the SSD. Upon satisfying the request, the OpenConfig agent serializes and transmits the requested NESI. Further, in another embodiment of the invention, a PSR is not instantiated upon activation of the OpenConfig agent; rather the PSR is instantiated upon receipt of a state information request. Nevertheless, regarding Step 216, if a determination is made that the PSR has not been populated, the process proceeds to Step 218; otherwise, if the PSR has been populated, the process proceeds to Step 222.

In one embodiment of the invention, upon being activated, the OpenConfig agent instantiates a PSR and continually populates the PSR with state information obtained from the system state database (SSD). In such an embodiment, this constant population process occurs regardless of receiving a state information request from a target entity. In other words, the OpenConfig agent may constantly populate and update an instantiated PSR prior to the submittal of a state information request; and upon reception of said request, the NESI.

In Step 218, state information associated with the network element is obtained. In one embodiment of the invention, the state information of a network element that is obtained corresponds to all or a subset of values in all data structures used by any of the network element agents at the given time. In other words, in one embodiment, NESI relevant to the received request is read from the system state database (SSD). In another embodiment, the OpenConfig agent retains a copy of the most recent state of a subset of all data structures used by any of the network element agents and, therefore, does not need to read state information from the SSD.

In Step 220, the PSR is populated using the NESI obtained in Step 218. The values of variables (or parameters) depicted in the obtained NESI, presented in the structure of the internal data model, are translated and stored into equivalent variables (or parameters) presented in the structure of the generated PSR. In one embodiment, population of the PSR includes the transformation of data traversing through one of the unidirectional data mapping pipelines discussed above. Further, in Step 220, the populated PSR may then be stored locally, where the PSR may be accessed and/or modified at later times due to SSD updates or changes received from the target entity.

In Step 222, the populated PSR is serialized using the preferred serialization encoding (PSE) negotiated and stored earlier in Step 214. In other words, the populated PSR is broken down into a stream of bytes, to facilitate data transfer, in a format specified by the PSE. In Step 224, the serialized PSR is encapsulated and transmitted across a network, towards the requesting target entity, using the preferred transport protocol (PTP) stored in Step 212.

Figure 3:
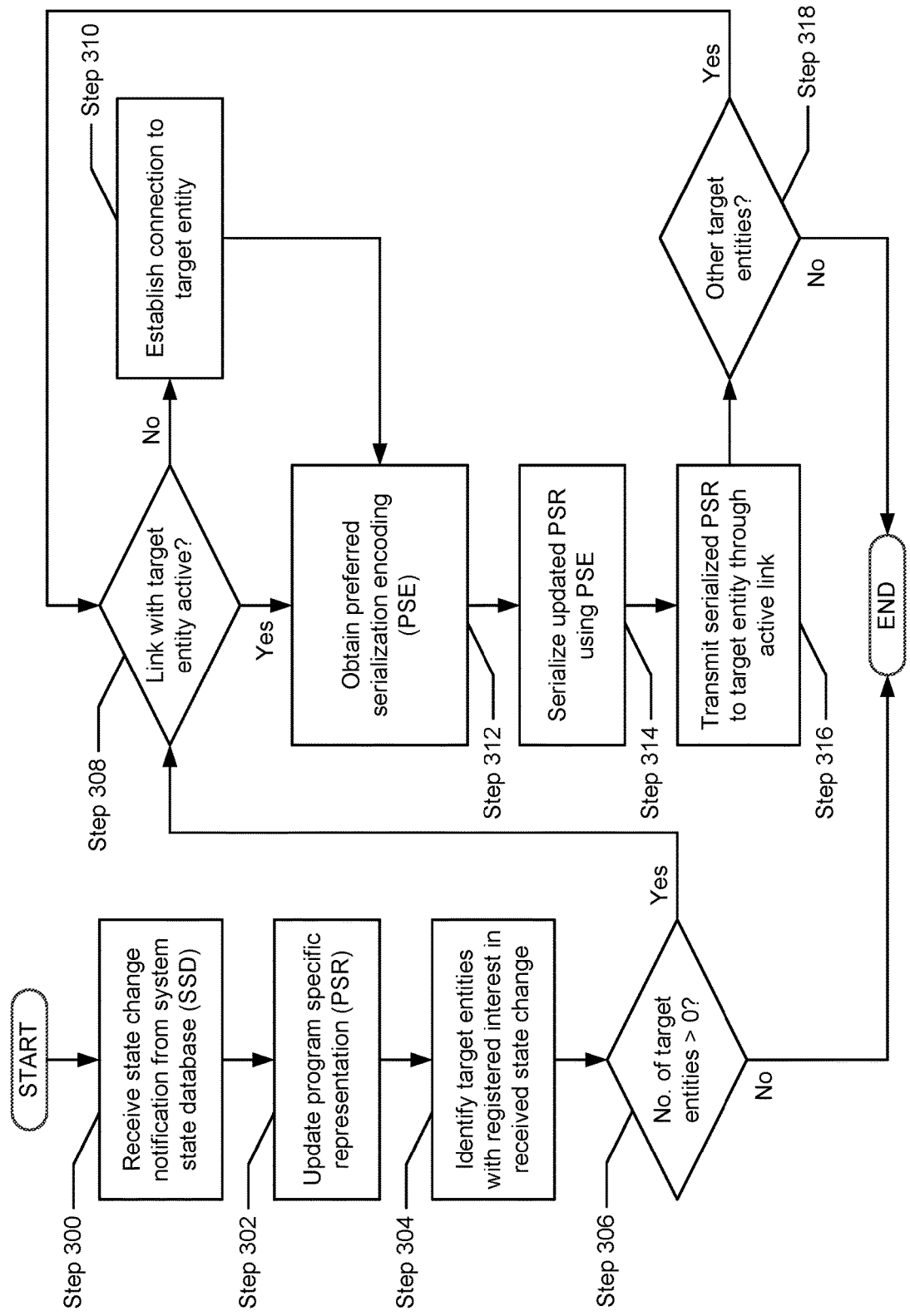
FIG. 3 shows a method for managing network element state information (NESI) in accordance with one or more embodiments of the invention.

Turning to FIG. 3, FIG. 3 shows a method for sending network element state information (NESI), using the structure of a PSR, in response to a change in the system state database (SSD) in accordance with one or more embodiments of the invention.

In Step 300, a state change notification, from the SSD, is received. More specifically, in one embodiment of the invention, a state change notification is issued whenever there is a change in a subset of NESI pertinent to the functionality of the OpenConfig agent. Subsequently, that change is sent to the OpenConfig agent.

In Step 302, the changes received in Step 300 are used to update the program specific representation (PSR) residing in (or accessible to) the OpenConfig agent. Similar to the process described in Step 214 of FIG. 2, in one embodiment of the invention, any received changes that are presented in internal data model form are translated by way of data mappings (see e.g., FIG. 2, step 210) into PSR (or external data model (EDM)) form.

In Step 304, target entities (e.g., $3^{rd}$ party devices, virtual machines executing on $3^{rd}$ party devices, etc.), to which the updated PSR is to be sent, are identified. More specifically, in one embodiment of the invention, during the initial communication with the network element, a target entity may register interest in receiving NESI changes as they are received. Depending on the preference of the target entity, updates may be forwarded when a portion of a data structure, a data structure, a set of data structures, or any other granularity of data structure(s) has been changed. In another embodiment of the invention, the target entity may register interest in receiving NESI changes as they are received at any point in time (i.e., not just during the initial communication).

In Step 306, after a list of target entities has been compiled, a determination is made whether there were any target entities that expressed interest in the change received in Step 300. If a determination is made that the number of identified target entities equals zero, then the process ends; otherwise, if the determination has concluded that the number of identified target entities is non-zero, the process proceeds to Step 308.

In Step 308, another determination is made with regards to whether a link (or connection) to a current target entity is active. In one embodiment of the invention, the network element retains an always active connection with one or more target entities. Continuing with Step 308, if a determination is made that the link between the network element and a current, identified target entity, is active, then the process proceeds to Step 312; otherwise, if for any of the reasons described above, a link to the current target entity is inactive, then the process proceeds to Step 310.

In Step 310, upon determining that the network element is not actively connected to the current target entity, a link to that current target entity is established. In one embodiment of the invention, the network element waits until the transport protocol module (see 134A in FIG. 1D) corresponding to the preferred transport protocol (PTP), associated with the current target entity, is available before establishing a connection to the current target entity.

In Step 312, the preferred serialization encoding (PSE) associated with the current target entity is obtained. In one embodiment, during an introductory connection between the network element and the current target entity, a PSE was negotiated and stored for future reference. In another embodiment, upon a more recent connection with the current target entity, as in the case of Step 310, the current target entity may indicate a different PSE than the one that was initially stored.

In Step 314, the updated PSR (Step 302), containing changes to the NESI, is serialized (or converted into a stream of bytes) using the PSE obtained in Step 312. Subsequently, in Step 316, the serialized PSR is encapsulated and transmitted, across the network, towards the current target entity using the transport protocol specified by the PTP associated with that current target entity. Further, in Step 318, a determination is made about whether there are additional target entities that have been identified as having registered interest in the state changes received in Step 300. If a determination is made that there are no other target entities, then the process ends; otherwise, the process proceeds back to Step 308.

Figure 4:
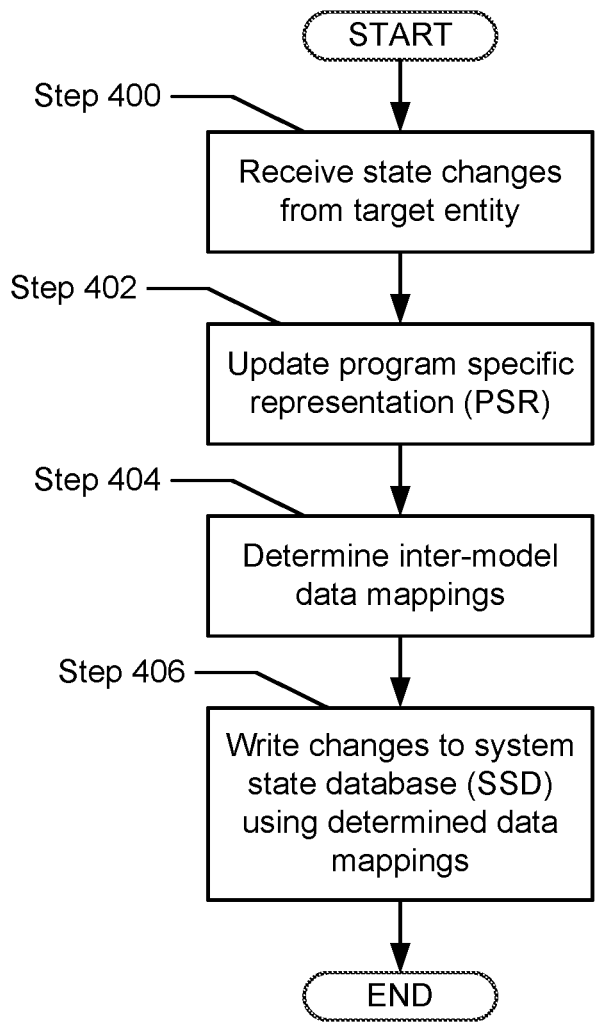
FIG. 4 shows a method for managing network element state information (NESI) in accordance with one or more embodiments of the invention.

FIG. 4 shows a method for sending network element state information (NESI) from a target entity to the system state database (SSD) on a network element in accordance with one or more embodiments of the invention.

In Step 400, state changes originating from a target entity are received. In one embodiment of the invention, the target entity may transmit new values for one or more variables (i.e., state changes) in order for the network element to implement a new configuration.

In Step 402, the copy of the PSR, on the network element, is updated based on the state changes received in Step 400.

In Step 404, data mappings between the PSR and the proprietary, internal data model, used in the system state database (SSD), are determined. In one embodiment of the invention, the process here is substantially similar to the determination of data mappings that occur in Step 210 of FIG. 2, with the exception that the translating is performed in the reverse direction. More specifically, for every variable (or parameter) impacted by the state changes provided by the target entity, the address and value of that variable (or parameter) in the PSR are translated into one or more addresses and values corresponding to that variable (or parameter) in the proprietary, internal data model.

In Step 406, by way of the data mappings determined in Step 404, the state changes received in Step 400 are written to the system state database (SSD). That is to say, the value from a variable (or parameter), impacted by the state changes presented by the target entity, is transmitted through a secondary data mapping pipeline (discussed above) from the PSR to the internal data model. While traversing the pipeline, the data, in one embodiment of the invention, may undergo type conversions and path address translations, until the transformed data deposits into the SSD. Additional and/or alternative functions that alter the data may be provided and/or exist without departing from the scope of the invention.

The following section shows an example EDM and a corresponding PSR in accordance with one or more embodiments of the invention. The example is not intended to limit the scope of the invention.

Example EDM

```
module bgp {
  yang-version "1";
  namespace "openconfig:bgp";
  prefix "bgp";
   container global {
    container config {
     leaf as { type inet:as-number; }
     leaf router-id { type inet:ipv4-address; }
    }
    container state {
     leaf as { type inet:as-number; }
     leaf router-id { type inet:ipv4-address; }
    }
   }
  }
```

Example PSR Corresponding to "Leaf Router-Id" in Example EDM

```
/bgp/global/config/router-id: {
  NodeType: "Leaf",
  LeafType: "string",
  YangKind: "Leaf",
  Statement: "leaf "router-id" { type "inet:ipv4-address"; description "Router id of the router, expressed as an 32-bit value, IPv4 address."; } ",
  Value: "1.2.3.4",
  YangType: {
   Name: "ipv4-address",
   Kind: 18,
   Bit: null,
   Enum: null,
   Units: "",
   Default: "",
   FractionDigits: 0,
   Length: null,
   OptionalInstance: false,
   Path: "",
   Pattern: [
    "(([0-9]|[1-9][0-9]|1[0-9][0-9]|2[0-4][0-9]|25[0-5])\.){3}([0-9]|[1-9][0-9]|1[0-9][0-9]|2[0-4][0-9]|25 [0-5])(%[\p{N}\p{L}]+)?"
   ],
   Range: null
  }
 },
```

As discussed above, the PSR is mapped to an internal data model. In this example, the mapping between the PSR and the internal data model for the router-id leaf specifies that the PSR path/bgp/global/config/router-id maps to the internal data model path/routing/bgp/config/routerId. Further, mapping is associated with a function that to transform the value of the PSR, which is of type inet:ipv4-address, to its corresponding value in the internal data model, which is of type Arnet::IpAddr. In one embodiment of the invention, the aforementioned function may be implemented using non-transitory executable computer readable instructions located on the network element.

Figure 5:
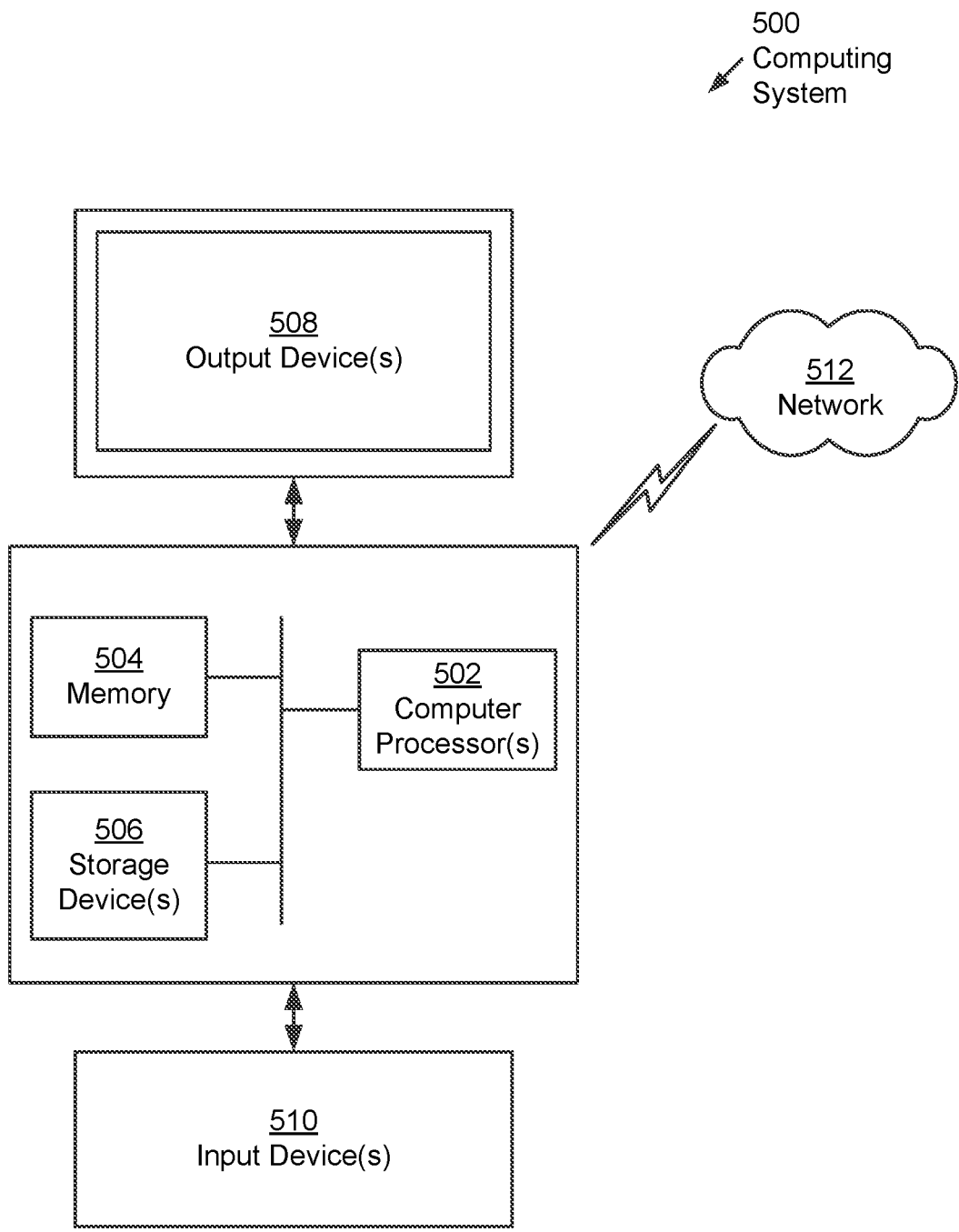
FIG. 5 shows a computer system in accordance with one or more embodiments of the invention.

Embodiments of the invention may be implemented on a computing system. Any combination of mobile, desktop, server, embedded, or other types of hardware may be used. For example, as shown in FIG. 5, the computing system (500) may include one or more computer processor(s) (502), associated memory (504) (e.g., random access memory (RAM), cache memory, flash memory, etc.), one or more storage device(s) (506) (e.g., a hard disk, an optical drive such as a compact disk (CD) drive or digital versatile disk (DVD) drive, a flash memory stick, etc.), and numerous other elements and functionalities. The computer processor(s) (502) may be an integrated circuit for processing instructions. For example, the computer processor(s) may be one or more cores, or micro-cores of a processor. The computing system (500) may also include one or more input device(s) (510), such as a touchscreen, keyboard, mouse, microphone, touchpad, electronic pen, or any other type of input device. Further, the computing system (500) may include one or more output device(s) (508), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (500) may be connected to a network (512) (e.g., a local area network (LAN), a wide area network (WAN) such as the Internet, mobile network, or any other type of network) via a network interface connection (not shown). The input and output device(s) may be locally or remotely (e.g., via the network (512)) connected to the computer processor(s) (502), memory (504), and storage device(s) (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (500) may be located at a remote location and connected to the other elements over a network (512). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing a network element comprising:
   receiving, from a target entity, a state information request for network element state information (NEST);
   obtaining, in response to the state information request, a program specific representation (PSR) populated with the NESI obtained from an internal data model on the network element;
   serializing the PSR using a preferred serialization encoding (PSE); and
   transmitting a serialized PSR, to the target entity, using a preferred transport protocol (PTP);
   receiving, from the target entity, a state change for the network element;
   based on the state change:
      updating the PSR to obtain an updated PSR, wherein the updated PSR comprises the state change; and
      updating an internal data model using the updated PSR, comprising:
         determining a plurality of data mappings between the updated PSR and the internal data model;
         implementing a data mapping pipeline based on the plurality of determined data mappings; and
         processing the updated PSR using the data mapping pipeline to store the state change in the internal data model,
      wherein, after the state change is stored, the network element performs a process using at least a portion of the updated internal data model.

2. The method of claim 1, wherein at least one of the plurality of data mappings comprises a function that maps an address and value in the updated PSR to at least one address and at least one value in the internal data model.

3. The method of claim 1, wherein the data mapping pipeline is a unidirectional conveyance of data between the updated PSR and the internal data model, and comprises a generator, at least one pipe function, and a sink.

4. The method of claim 3, wherein the at least one pipe function is one selected from a group consisting of a data type conversion function and a data address translation function.

5. The method of claim 1, wherein the internal data model is a vendor-proprietary state configuration data model associated with the network element.

6. The method of claim 1, wherein the target entity is one selected from a group consisting of a $3^{rd}$ party device and a virtual machine executing on the $3^{rd}$ party device.

7. The method of claim 1, further comprising:
   receiving a request from the target entity to obtain information about at least a portion of the NESI when the NESI changes on the network element; and
   after receiving the request and in response to determining a change in the at least the portion of the NESI, providing the at least a portion of the NESI to the target entity.

8. The method of claim 1, wherein the PTP is one selected from a group of transport protocols consisting of HTTP, HTTPS, HTTP2, SPDY, QUIC, gRPC, Thrift Mux, RESTCONF, NETCONF, SOAP, and XMPP.

9. The method of claim 1, wherein the PSE is one selected from a group consisting of JSON, XML, ASN.1, Protocol Buffer, Thrift, BSON, BDSN, YAML, "gob" from the Go programming language, and Cap'n Proto.

10. The method of claim 1, wherein the PSR comprises at least one data structure for storing the NESI.

11. The method of claim 1, wherein the NESI comprises of a plurality of records corresponding to a plurality of variables specified in the network element.

12. The method claim 11, wherein each of the plurality of records comprises a group of information consisting of at least a name, a current value, and a timestamp associated with each of the plurality of variables specified in the network element.

13. The method of claim 1, further comprising:
receiving an external data model (EDM) by the network element;
generating a second PSR based on the EDM;
mapping at least a portion of internal data model on the network element to the second PSR to generate a second mapping; and
servicing at least one request for the NESI using the second mapping and the second PSR.

14. The method of claim 1, further comprising:
in response to the state information request, determining that the program specific representation (PSR) is not populated with the NESI; and
based on the determination, populating the PSR with the NESI obtained from the internal data model.

15. A network element, comprising:
an internal data model
a data plane comprising a plurality of ports;
a control plane comprising an OpenConfig agent configured to:
receive, from a target entity, a state information request for network element state information (NESI);
obtain, in response to the state information request, a program specific representation (PSR) populated with the NESI obtained from the internal data model;
serialize the PSR using a preferred serialization encoding (PSE); and
transmit a serialized PSR, to the target entity, using a preferred transport protocol (PTP);
receive, from the target entity, a state change for the network element;
based on the state change:
update the PSR to obtain an updated PSR, wherein the updated PSR comprises the state change; and
update the internal data model on the network element using the updated PSR, comprising:
determining a plurality of data mappings between the updated PSR and the internal data model;
implementing a data mapping pipeline based on the plurality of determined data mappings; and
process the updated PSR using the data mapping pipeline to store the state change in the internal data model,
wherein, after the state change is stored, the network element performs a process using at least a portion of the updated internal data model.

16. The network element of claim 15, wherein the NESI comprises data stored in a system state database (SSD) in the control plane and data plane information from the data plane.

17. The network element of claim 15, wherein the PSE is one selected from a group consisting of JSON, XML, ASN.1, Protocol Buffer, Thrift, BSON, BDSN, YAML, "gob" from the Go programming language, and Cap' n Proto.

18. The network element of claim 15, wherein the PTP is one selected from a group consisting of HTTP, HTTPS, HTTP2, SPDY, QUIC, gRPC, Thrift Mux, RESTCONF, NETCONF, SOAP, and XMPP.

19. A non-transitory computer readable medium comprising computer readable program code, which when executed by a processor on a network element enables the processor to:
receive, from a target entity, a state information request for network element state information (NESI);
obtain, in response to the state information request, a program specific representation (PSR) populated with the NESI obtained an internal data model on the network element;
serialize the PSR using a preferred serialization encoding (PSE); and
transmit a serialized PSR, to the target entity, using a preferred transport protocol (PTP);
receive, from the target entity, a state change for the network element;
based on the state change:
update the PSR to obtain an updated PSR, wherein the updated PSR comprises the state change; and
update the internal data model on the network element using the updated PSR, comprising:
determining a plurality of data mappings between the updated PSR and the internal data model;
implementing a data mapping pipeline based on the plurality of determined data mappings; and
process the updated PSR using the data mapping pipeline to store the state change in the internal data model,
wherein, after the state change is stored, the network element performs a process using at least a portion of the updated internal data model.

* * * * *